United States Patent
Hsu et al.

(10) Patent No.: US 9,307,393 B2
(45) Date of Patent: Apr. 5, 2016

(54) PEER-TO-PEER MOBILITY MANAGEMENT IN HETEROGENEOUS IPV4 NETWORKS

(75) Inventors: Yuan-Ying Hsu, Taipei (TW); Tao Zhang, Fort Lee, NJ (US); Chung-Min Chen, Taipei (TW)

(73) Assignee: Telcordia Technologies, Inc., Piscataway, NJ (US)

( * ) Notice: Subject to any disclaimer, the term of this patent is extended or adjusted under 35 U.S.C. 154(b) by 1328 days.

(21) Appl. No.: 12/466,914

(22) Filed: May 15, 2009

(65) Prior Publication Data

US 2010/0293289 A1 Nov. 18, 2010

(51) Int. Cl.
| | | |
|---|---|---|
| G06F 15/16 | (2006.01) | |
| H04W 8/14 | (2009.01) | |
| H04L 29/12 | (2006.01) | |
| H04W 80/04 | (2009.01) | |
| H04L 29/06 | (2006.01) | |

(52) U.S. Cl.
CPC .............. *H04W 8/14* (2013.01); *H04L 61/251* (2013.01); *H04L 61/2525* (2013.01); *H04W 80/04* (2013.01); *H04L 29/12066* (2013.01); *H04L 29/12349* (2013.01); *H04L 29/12396* (2013.01); *H04L 29/12405* (2013.01); *H04L 61/1511* (2013.01); *H04L 61/2507* (2013.01); *H04L 61/2528* (2013.01); *H04L 65/1006* (2013.01)

(58) Field of Classification Search
CPC ............ H04L 61/2525; H04L 61/1511; H04L 61/2528; H04L 61/2507; H04L 61/251; H04W 80/04; H04W 8/14
USPC .................................................. 709/232, 227
See application file for complete search history.

(56) References Cited

U.S. PATENT DOCUMENTS

| 7,949,785 B2 * | 5/2011 | Alkhatib et al. ............... 709/245 |
| 2002/0129272 A1 * | 9/2002 | Terrell et al. ................... 713/201 |
| 2005/0010668 A1 * | 1/2005 | Chen ............................. 709/227 |
| 2010/0061309 A1 * | 3/2010 | Buddhikot et al. ............ 370/328 |

OTHER PUBLICATIONS

Bernaschi, M. Cacace, F. Iannello, G. Za, S. Pescape, A. "Seamless internetworking of WLANs and cellular networks: architecture and performance issues in a Mobile IPv6 scenario," IEEE wireless communications, vol. 12, Issue: 3, Jun. 2005.
Bemaschi, M. Cacace, F. Iannello, G. "Vertical handoff performance in heterogeneous networks," in proceedings of Parallel Processing Workshops ICPP 2004.
Hsieh, R. Zhou, Z.G. Seneviratne, A. "S-MIP: a seamless handoff architecture for mobile IP," in proceedings of INFOCOM 2003.
AT Campbell, J Gomez, S Kim, CY Wan, "Comparison of IP Micromobility Protocols," IEEE Wireless Communications, 2002.

* cited by examiner

*Primary Examiner* — David Lazaro
*Assistant Examiner* — Xiang Yu

(57) ABSTRACT

Peer-to-peer mobility management in heterogeneous IP networks provides a peer-to-peer mobility module operable to intercept a data packet received at a communication protocol layer of an Internet Protocol communication stack. A translation table may be stored on memory device. The translation table stores real address of one or more network interfaces and a corresponding virtual address. The peer-to-peer mobility module may be further operable to modify the intercepted data packet using the real address and virtual address stored on the translation table.

20 Claims, 6 Drawing Sheets

PEER-TO-PEER MOBILITY MANAGEMENT IN HETEROGENEOUS IPV4 NETWORKS

FIELD OF THE INVENTION

The present application relates generally to networks, and more particularly to mobility and roaming management in networks.

BACKGROUND OF THE INVENTION

A mobile node may have multiple interfaces like wireless local area network (WLAN), Universal Mobile Telecommunications System (UMTS), General packet radio service (GPRS), Worldwide Interoperability for Microwave Access (WiMAX) and others, and may switch its current communication to any network interface according to user request. An example reason for switching may be that the current wireless network has low signal strength or no signal coverage. However, while switching from one network interface to another, the mobile node may experience difficulties in maintaining the network connectivity and also handoff delays. Handoff delay is measured as the delay from the last to first packet that receiver receives from the sender with original and new network interfaces. For instance, handoff delay may be about 2 to 5 seconds, which may not be acceptable for many real-time services like Voice over Internet Protocol (VoIP) and streaming services. Also, some applications are sensitive to handoff delays (e.g., VoIP services) and some may break due to long delays (e.g., Transmission Control Protocol (TCP) connection).

Existing methods attempt to address some of the above mentioned mobility management problems. Those known methods could be classified according to which protocol layer a method could be applied to: link layer, network layer, or session/application layer solutions. Link layer solutions, however, cannot handle mobility requirements at higher protocol layers, such as change of Internet Protocol (IP) addresses as a mobile node moves from one IP subnetwork to another. Network layer solutions are more general to all applications. A typical network-layer solution is mobile IP. Session layer or application layer solutions are limited to a specific application. Representative examples of session/application layer mobility methods are methods based on the Session Initiation Protocol (SIP).

Mobile IP employs a home agent in the home network of mobile nodes, and each mobile node has a permanent home IP address. When the mobile node roams outside of the home network, it would acquire a care-of address and registers the address to its home agent. All traffic from a corresponding node destined to the mobile node will have its home IP address as the destination address. If the mobile node is currently inside its home network, it could easily get the packets. Otherwise, its home agent will intercept the packets for it and tunnel the packets to its care-of address. Similarly, all traffic sent from the mobile node will have its home address as the source address in the IP header, and the packet will then be tunnelled with its care-of address to the home agent. Upon receiving the packet from the mobile node, the home agent will decapsulate the packet and forward it to the corresponding node.

In mobile IP, all traffic sent from/to mobile nodes need to be tunneled to the home agent. This may cause triangular routing problem when the mobile node is close to the corresponding node and far away from its home agent. Route optimization is used to get around this problem. When the home agent finds there is a corresponding host that wants to communicate with a mobile node away from its home network, the home agent sends a binding update message to inform the corresponding node about the care-of address of the mobile node. The corresponding node could then tunnel the packets to the care-of address directly. If the corresponding node does not know the movement of the mobile node and keeps sending traffic to the old care-of address, the foreign agent will send a binding warning message to the home agent. Upon receiving binding warning message, the home agent sends binding update message to the corresponding node with the update care-of address of the mobile node.

Mobile IP without route optimization needs to build a tunnel from the home agent to the mobile node, so all traffic destined to the mobile node could be forwarded to the mobile node via this tunnel. Unfortunately, unidirectional tunnel may cause ingress filtering problem. The ingress filtering problem happens when routers at foreign networks do not allow packets having source IP address outside their subnets to be sent. Since a mobile node always uses its home address as the source address of all packets, these packets will be filtered by routers in foreign networks. Therefore, in practicality, most implementations of mobile IP establish a bi-directional tunnel between the mobile node and its home agent. All traffic from/to the mobile node will go through this tunnel, and cause inefficiency.

If route optimization is applied, explicit signal messages are still required to inform the corresponding node about the new care-of address of the mobile node. Besides, foreign agent is required at each foreign network to send binding warning messages or the home agent needs to know the list of corresponding nodes of each mobile node so that it could send binding update message to update their information about the new care-of address of the mobile node.

Whether the route optimization is applied or not, mobile IP still has a problem of long handoff delay. Each mobile node needs to register its new care-of address with its home agent before other hosts know the mobile's new care-of address and traffic to the mobile can be directed to this new address. This could lead to heavy delays when the home agent is far away.

In the mobile IP like solutions, the mobile node needs to send registration or binding update message to the home agent or the corresponding node. In such solutions, it is found that at least one round trip time delay from the mobile node to the anchor node is required.

SIP mobility, on the other hand, is a solution designed for SIP sessions. A SIP proxy is deployed on the Internet. When a mobile node changes its IP address, it needs to send a SIP registration message to the SIP proxy to update its current location. Each SIP session is established by SIP proxy. Specifically, a corresponding node would send a SIP invite message to the proxy to request for setting up a session to the mobile node. This invite message will then be forwarded to the current address of the mobile node. If the mobile node moves again during this session, it needs to send another invite message to the proxy to inform the corresponding node that it has changes to another IP address. Afterwards, the session will be established to the new IP address of the mobile node.

SIP, however, has the same drawback of the handoff delay as mobile IP has. A mobile node still needs to send IP messages to the corresponding node or a SIP server to update the mobile's new address. The session will be delayed for at least one round trip time. Besides, SIP-based mobility support solutions typically apply to only SIP services. Not all applications could employ this solution to handle mobility issues.

SIP or other application solutions are also designed for dedicated services. They still need to send update message to the corresponding node or any other elements in the Internet like SIP proxy. Therefore, they could not eliminate handoff delay and could not be applied to all applications.

BRIEF SUMMARY OF THE INVENTION

A system and method for peer-to-peer mobility management in heterogeneous IP networks are provided. The system in one aspect may comprise a peer-to-peer mobility module operable to intercept a data packet received at a communication protocol layer of an Internet Protocol communication stack. A translation table may be stored on memory device, the translation table storing real address of one or more network interfaces and a corresponding virtual address. The peer-to-peer mobility module may be further operable to modify the intercepted data packet using the real address and virtual address stored on the translation table.

A method for peer-to-peer mobility management in heterogeneous IP networks, in one aspect, may comprise intercepting a data packet received at a communication protocol layer of an Internet Protocol communication stack, and determining an address of a network interface in the data packet. The method may also include modifying the data packet by replacing the address with a mapped address in the data packet, and transmitting the modified data packet to a next layer in the Internet Protocol communication stack.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

This disclosure describes a method and system for a mobile node with multiple communication interfaces to roam seamlessly between heterogeneous networks. The present disclosure also describes a mobility solution to reduce handoff delay for mobile nodes roaming between heterogeneous networks.

The method of the present disclosure in one embodiment maintains network connectivity while switching from one network interface to another. The method of the present disclosure also may minimize the handoff delay, i.e., delay in switching from one network interface to another.

In one embodiment of the method and system of the present disclosure, explicit signal messages that signal a change in the network interface are not required to support mobility. The method and system of the present disclosure in one embodiment provides a middleware that may be installed on the mobile node and the corresponding node, and that could translate addresses transparently to upper applications to support mobility.

Figure 1:
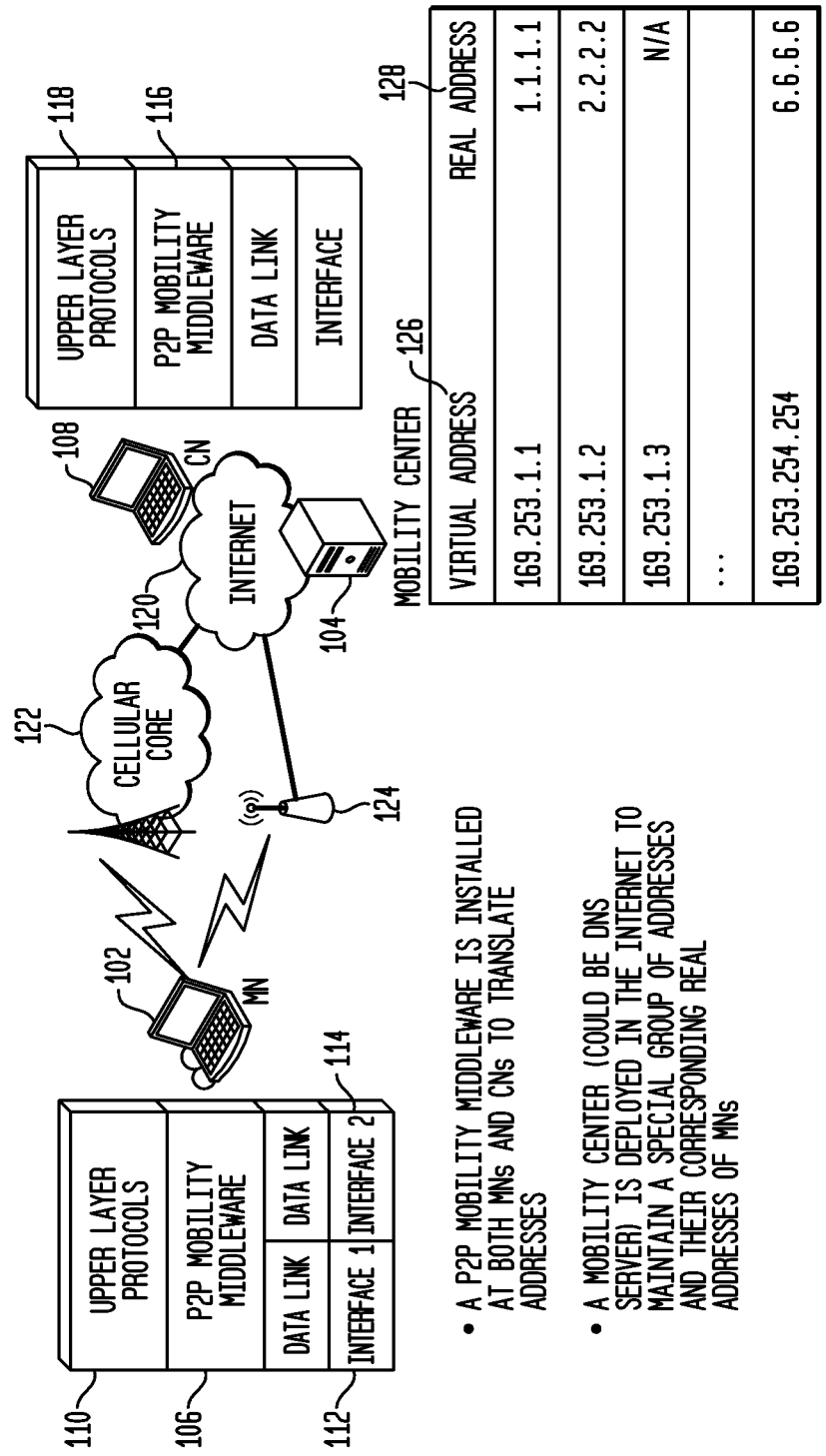
FIG. 1 illustrates an embodiment of system architecture of the present disclosure.

FIG. 1 shows an example of system architecture in one embodiment. A mobile node (MN) 102 can have multiple communication interfaces (e.g., WLAN and UMTS shown in FIG. 1). A mobile node may be any mobile device and that may have communication capabilities such as transmitting and receiving signals. Examples of mobile nodes may include but are not limited to cellular telephones, smart phones, laptops and other mobile computers, personal digital assistants (PDA) and like. Each interface may have a real IP address for routing purpose. In one embodiment of the method and system of the present disclosure, a mobility center 104 may be added and located somewhere in the Internet 120 to be responsible for managing a range of special group of virtual IP addresses and their corresponding real addresses of MNs. These virtual addresses are not required to be routable addresses. For illustrative purposes, the example in FIG. 1 assumes address space is 169.253.x.x. If a certain virtual address is assigned to a mobile node 102, the mobility center 104 records or stores the corresponding current real IP address of the mobile node 102, which is the real IP address of the interface that the mobile node 102 currently uses. The mobility center may be a domain name server (DNS).

A peer-to-peer mobility middleware may be installed at both mobile nodes (MNs) and corresponding nodes (CNs) to translate addresses. A corresponding node (CN) refers to any device that can communicate, for instance, with the MN, and may be any communication or computing device. CN need not be a mobile device. Examples of CN include but are not limited to a personal computer, workstation, laptop, smart phone, cellular phone, PDA, or others. For instance, as shown in FIG. 1, a peer-to-peer mobility middleware (p2pMM) 106 may be installed in the MN. A p2pMM 116 is also installed in the corresponding node (CN) 108. The p2pMM 106, 116 snoops each packet from and/or to upper protocol layer 110, 118 and translates address between virtual and real IP addresses. For example, in FIG. 1, the MN 102 has two communication interfaces 112 and 114, and MN currently uses interface 2 (114) to send and receive data. MN 102 may communicate with the CN 108 in the Internet 120 via a cellular core 122 or a wireless LAN access point 124. The p2pMM 106 translates the source address of packets sent from the upper layer 110 to current real IP address, and also may help to translate destination address of packets sent to the upper layer 110 to the virtual address. In one embodiment, p2pMM performs the address translation according to the transition table it maintains. Hence, all applications may be transparent to mobility issue and simply use virtual address for all sessions. Furthermore, the mobility issue could be solved directly by data transmission without any signal messages.

In one embodiment, the mapping of virtual address 126 and real addresses 128 are stored in the mobility center for virtual address conflict prevention and session initiation purpose. When an MN boots up, it requests a virtual address from the mobility center. The mobility center can guarantee that no two MNs on the Internet use the same virtual address by checking the stored mappings of virtual address 126 and real addresses 128. Another purpose of mobility center is to respond a CN with the real address of a certain virtual address used by an MN when it wants to make connection to the MN, so the CN p2pMM could know how to translate the address for the MN.

Figure 2:
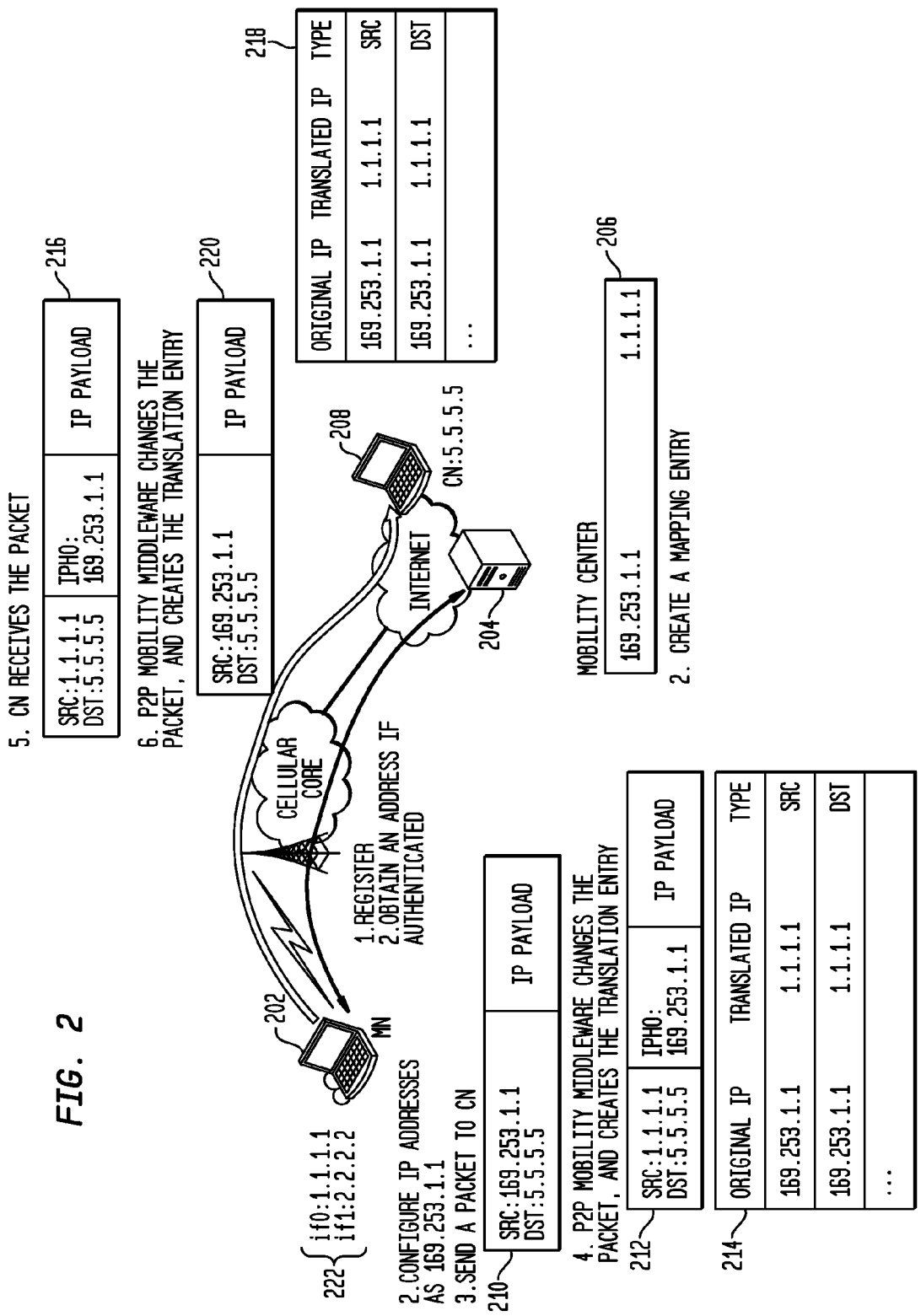
FIG. 2 is a diagram illustrating initialization procedure in one embodiment of the present disclosure, in which a mobile node (MN) sends packets to a corresponding node (CN).

FIGS. 2, 3, 4 and 5 illustrate operations of peer-to-peer mobility management of the present disclosure in one embodiment. Referring to FIG. 2, a mobile node 202 in this example uses two interfaces having addresses "1.1.1" and "2.2.2.2" as shown at 222.

The mobile node 202 requests a virtual address from the mobility center 204, for instance, by registering with mobility center 204. The mobility center 204 authenticates the mobile node 202 and provides an available address after properly authenticating the device. The registering and obtaining or assigning an address can be performed using any standard address allocation protocols such as the Dynamic Host Configuration Protocol (DHCP) or other known or will be known methods. For instance, the MN 202 may be configured as DHCP client and the mobility center 204 may be configured as DHCP server. Any authentication mechanism could be adopted for the mobility center to authenticate the mobile node. The MN 202 configures its IP address received from the mobility center 204, for example, 169.253.1.1.

The mobility center also creates an entry or record that maps the current real IP address that the mobile node uses to the assigned virtual address. For instance, real IP address that MN currently uses could be obtained from the source IP address when the MN sends an address request message to the mobility center. This could also be obtained inside the address request message if it exists. The created mapping between the mobile's virtual address and current real IP address is saved or stored. An example of a mapping entry is shown at 206. After having a virtual address 169.253.1.1 assigned from the mobility center, all applications in the mobile node 202 send packets with this address as the source IP address. An example of a packet specifying the current IP address is shown at 210. Applications create this packet, setting source IP address as machine's IP address, which is configured as virtual address. In one embodiment of the present disclosure, these packets are snooped by the internal module p2pMM (e.g., 106 in FIG. 1) before being delivered to the network. The p2pMM switches the source address to the real IP address of current serving interface (1.1.1.1) and puts the original source address into one of the IP header options ("IPHO"), e.g., mobility option. An example of the updated packet including the switched address and mobility option is shown at 212. The translated packet 212 may be sent to the corresponding node 208 directly. In one embodiment, in addition to performing address translation, the p2pMM at MN also creates two entries of both source IP and destination IP addresses transitions in its translation table 214. All packets having 169.253.1.1 as their source or destination address will be translated into 1.1.1.1 by p2pMM at MN according to the entries in the translation table 214. The entries in the translation table 214 are added dynamically during connection setup. The corresponding node 208 receives this packet 216 and the p2pMM installed in the CN 208 intercepts the packet 216 and checks if there is mobility option in the IP header. If there exists the option, the p2pMM translates the source address of the packet to the address specified in the mobility option (e.g., in this case, 169.253.1.1). The p2pMM of the CN 208 also creates two translation entries in its translation table 218. The packet 220 may be then passed to the upper layer to the application.

Figure 3:
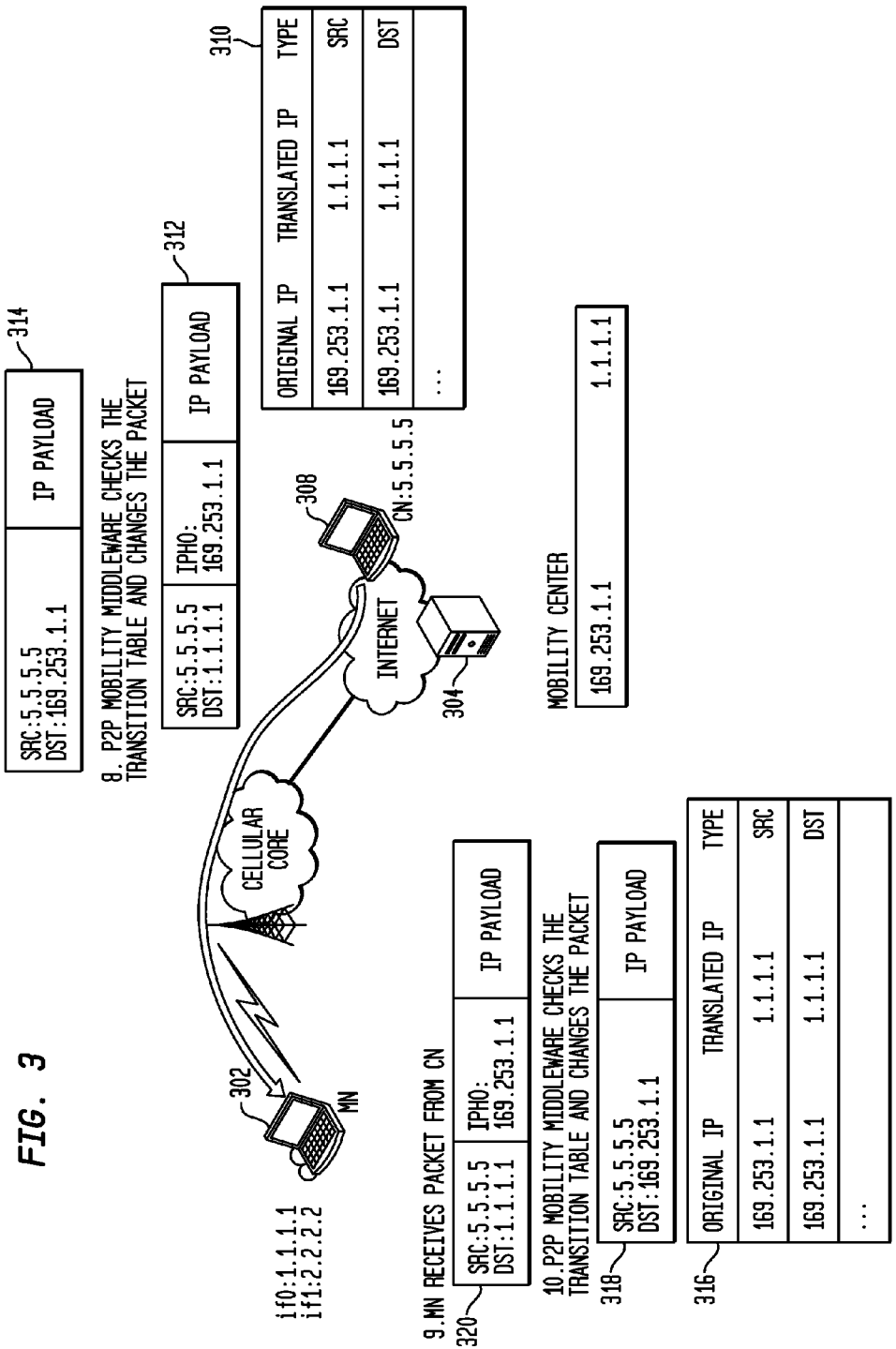
FIG. 3 is a diagram illustrating initialization procedure in one embodiment of the present disclosure, in which CN replies packets to MN.

FIG. 3 illustrates operations in a scenario in which the CN sends a packet back to the MN. CN 308, for instance, its application may reply with a packet shown at 314. At this point, CN 308 has a translation entry for the MN in a translation table 310, for instance, as described above with reference to FIG. 2. The p2pMM (e.g., 16 in FIG. 1) in the CN 308 may translate the destination address from the virtual IP address to the current real address of the mobile node 302 as recorded in the translation table 310. The changed packet 312 is then sent to the MN. The p2pMM at MN 302 receives the packet 320 and performs the translation according to its translation table 316 into a packet 318 as shown in FIG. 3. In this way, applications at both MN and CN use the virtual address of the MN to identify the session and thus the mobility may be completely transparent to the applications and users.

Figure 4:
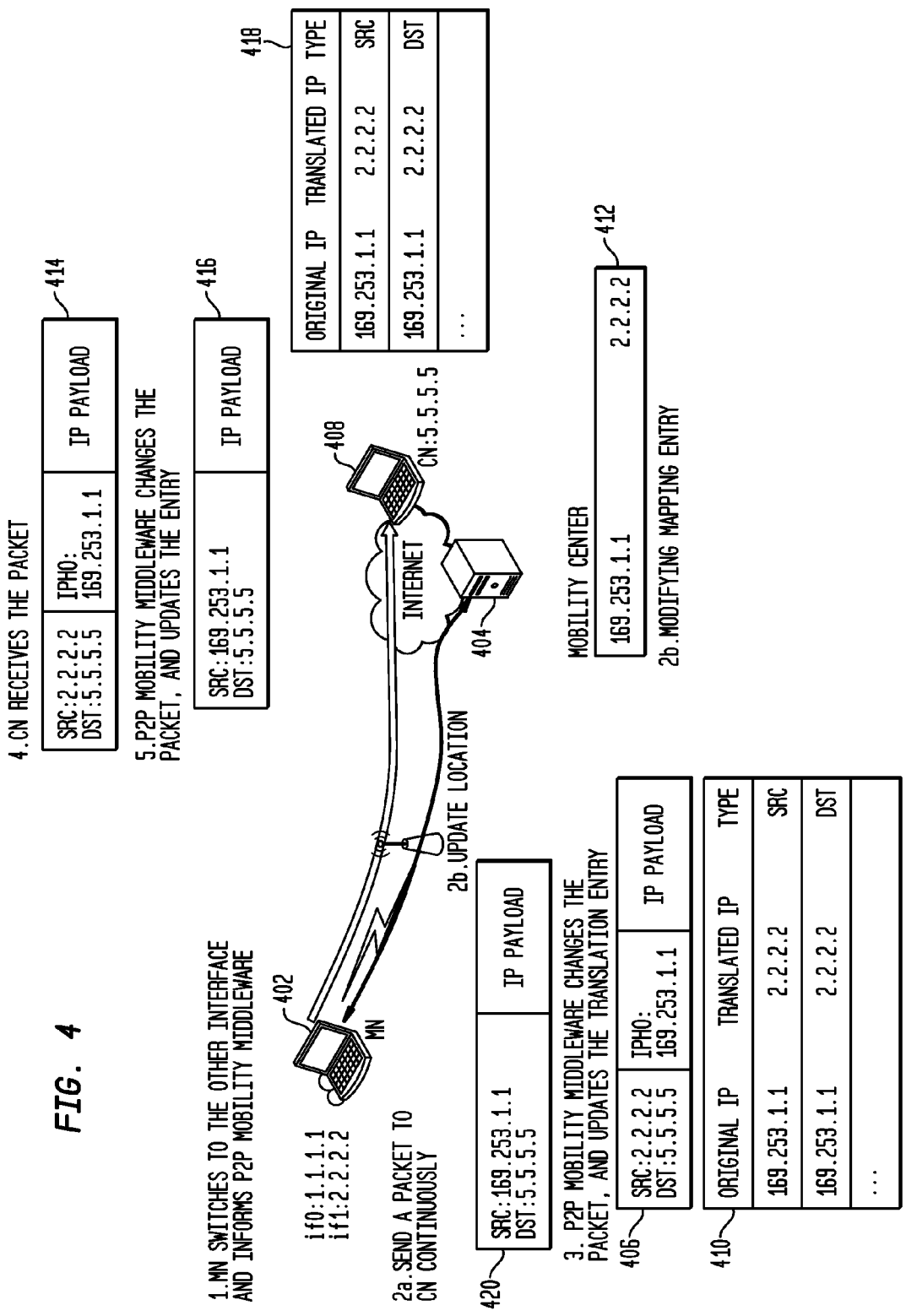
FIG. 4 is a diagram illustrating roaming procedure in one embodiment of the present disclosure, in which sends packets to CN.
Figure 5:
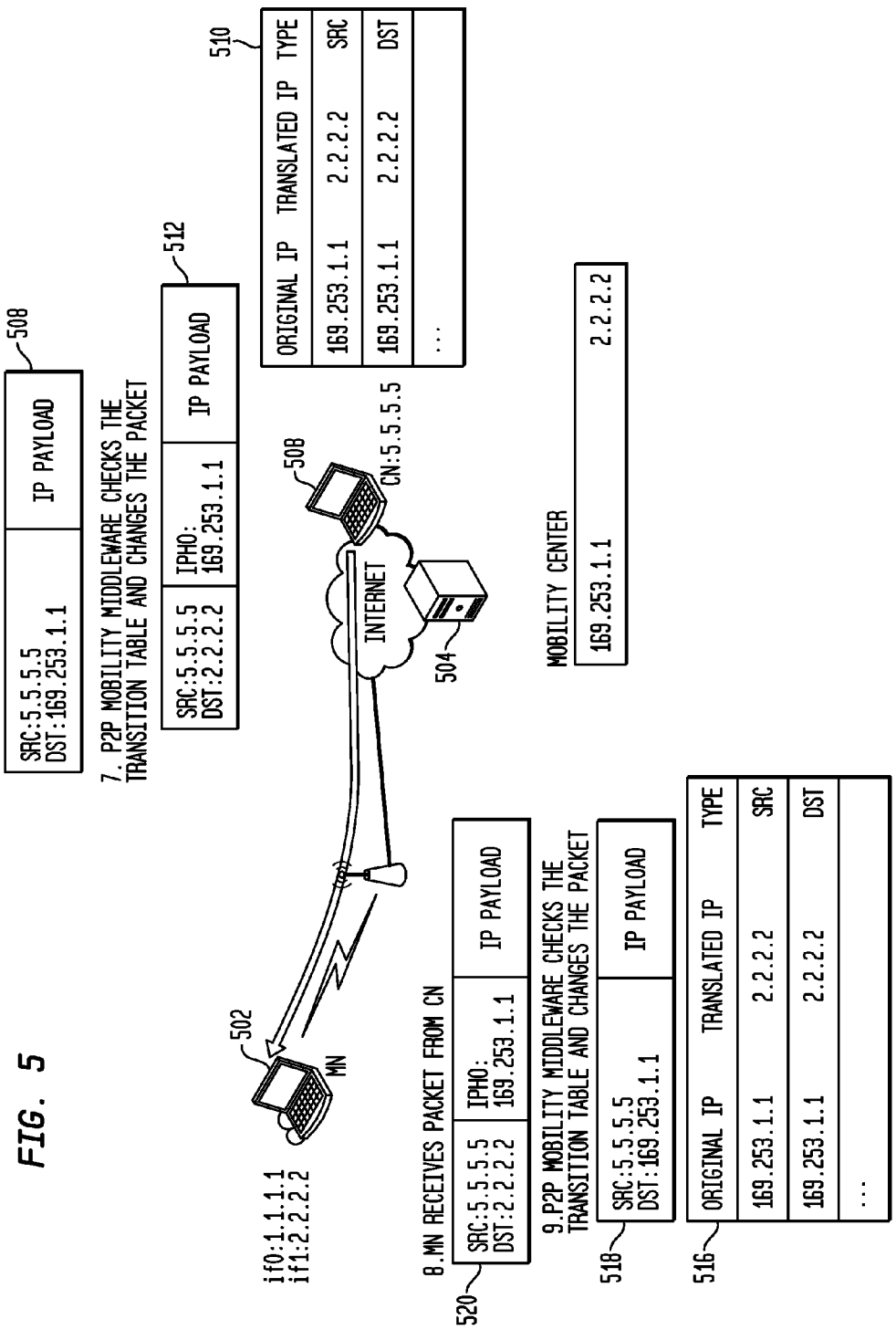
FIG. 5 is a diagram illustrating roaming procedure in one embodiment of the present disclosure, in which CN replies packets to MN.

If the mobile node moves or roams to another network by switching its interface, the current real IP address will be changed. The p2pMM could be informed by, for example, a layer 2 triggered event (e.g., IEEE 802.21) and is made aware of the new address, i.e., the address of the switched to interface. FIG. 4 and FIG. 5 illustrate the operations of roaming. The operations are similar to the data transmission operations described in FIG. 2 and FIG. 3. Applications could keep sending data without any change, but p2pMM changes its translation according to the new interface address, e.g., which it is informed of from the layer 2 event. Referring to FIG. 4, the MN 402 switches to another interface and informs its p2pMM. The p2pMM in the MN 402 translates the source address of the packet to the new current real address 2.2.2.2 as shown at 406, and the translation table is also updated as shown at 410. The p2pMM also adds an entry in the mobile option (e.g., IPHO) also shown at 406. Thus, for example, applications continue to send packet shown at 420, but the actual packet sent out to the Internet is the translated one shown at 406. NM keeps transmitting packets to CN while switching to the new network interface. In other words, applications on the MN need not know and may be unaware of roaming, and the packet could be sent continuously without interruption.

The corresponding node receives the packet as shown at 414, and the p2pMM of the CN 408 changes the packet to include the virtual IP address for the source and updates the entry as shown at 416, i.e., IPHO entry is deleted. The p2pMM of the CN 408 also updates its translation table 418 to map the virtual IP address (e.g., 169.253.11) to the real address of the new interface (e.g., 2.2.2.2). The p2pMM may use this translation table 418, for example, so that it could perform correct translation when sending a response back to the MN 402. The p2pMM in the mobile node 402 also sends a message to tell the mobility center that the mobile node with virtual address 169.253.1.1 has changed its current real address to 2.2.2.2. The mobility center 404 modifies its mapping entry with the new information as shown at 412. This information allows other nodes to be able to reach the mobile node 402 after roaming.

FIG. 5 illustrates operations in which a CN send a response back to the MN after MN roams to another network interface. CN 506 sends a reply packet 508 to respond to the MN 502. The p2pMM of CN 506 checks its translation table 510 and replaces the destination IP address to the mapped real address as shown at 512. The p2pMM of CN 506 also inserts a mobility option entry (e.g., IPHO specifying the virtual IP address that was replaced) in the translated or modified packet 512. The modified packet 512 is sent to the MN 502. MN 502 receives the packet 514 from the CN 506. The p2pMM of MN 502 checks its translation table 516 and determines the virtual address (e.g., 169.253.1.1) mapped to the real address (e.g., 2.2.2.2) in the packet 514. The p2pMM of MN 502 changes the packet 514 to include the real address (e.g., 2.2.2.2) to the mapped virtual address (e.g., 169.253.1.1) in the packet 514 and also deletes the mobility option entry. The modified packet 518 is then passed to the application.

Figure 6:
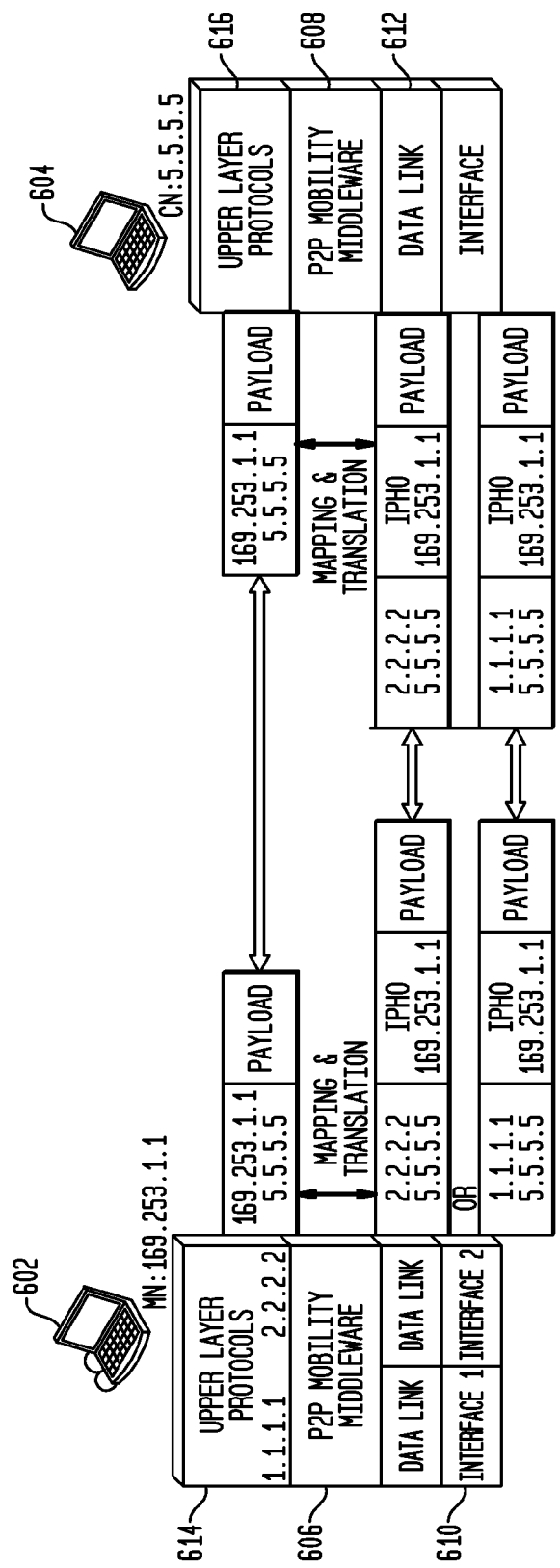
FIG. 6 illustrates a communication protocol stack in one embodiment of the present disclosure.

FIG. 6 illustrates a set of communication protocols including the p2pMM of the present disclosure installed on a mobile device. Mobile node or devices such as MN 602 and CN 604 shown in FIG. 6 may include p2p mobility middleware p2pMM) 606, 608. P2p mobility middleware (e.g., 606, 608) may be installed between the link layer (e.g, 610, 612) and upper layers protocols (e.g., 614, 616) in the communication protocol stack. The p2pMM (e.g., 606, 608) could help to translate addresses transparently to the upper layer applications (e.g., 614, 616). It can be seen in FIG. 6 that applications always think that the two ends of the connection is 169.253.1.1 and 5.5.5.5 regardless of the change in the real address of the interface used at a mobile node. In one embodiment, the p2pMM is installed above all communication interfaces and performs translation for all packets. With the mobility support methodology of the present disclosure, applications need not be modified to support mobility. Rather, applications may be completely transparent to (i.e., need not be aware of) mobility or roaming issues. Thus, the proposed p2p mobility management approach could be applied to all applications.

In one aspect, the p2p mobility management of the present disclosure as described above does not need any signal message to be exchanged to let the corresponding node to be aware of the mobile node's address change. All address translations have been done automatically using information embedded in data packets of the traffic between the mobile node and its corresponding node. For example, as described above, the p2pMM translates the addresses automatically based on the information in the data packets. Mobile nodes could keep sending packets without any delay, and the p2pMM could transparently translate addresses according to the most up-to-date layer 2 information.

The peer-to-peer mobility management solution as described above also may have a mobility center in the Internet. A mobile node updates its address at the mobility center when it roams, however, this update procedure does not affect any on-going connections. In one embodiment, all existing connections could perform the translation immediately after switching interfaces or changing addresses since the p2pMM will change the translation immediately and automatically in one embodiment. The mobility center update procedure is for those sessions to reach correct address of the mobile node after handoff.

The system and method of the present disclosure allow mobility or roaming issues to be solved purely by data packets that naturally flow between the communicating nodes. No extra signaling message is required for supporting the mobility of the on-going sessions, and thus no handoff delay is introduced. Improvements to mobile IP for the past 15 years tried to shorten the handoff delay by either performing registration in advance or sending registration to other nearer nodes. None of them is the approach without signaling.

In one aspect, the system and method of the present disclosure provides a mobility solution that is purely embedded into data packets of the user traffic between the communicating parties. No extra signal message needs to be exchanged to handle mobility issue. Therefore, the approach of the present disclosure may completely eliminate handoff delay incurred above link layer. Additional link layer association delay may be reduced by performing association in advance in heterogeneous networks. In one aspect, most of handoff delay may be reduced, for example, from three seconds to less than one second. Reducing delays could make an application run smoothly during handoff, and thus users could use more and more applications while roaming without worrying about connections being broken.

In another aspect, no new element may need to be deployed in the Internet with the system and method of the present disclosure in one embodiment. For instance, a mobility center in the Internet that help manage addresses and maintain address mappings may be implemented in an existing DNS server. Yet in another aspect, the system and method of the present disclosure in one embodiment is independent of applications and therefore can support all applications.

As described above, p2pMM, the middleware may be installed in both mobile nodes and corresponding nodes. With the p2pMM installed, a node may be enabled to switch interfaces smoothly or move to other networks with minimum handoff delay. A mobility center service also may be offered for a node to register and update its addresses to the mobility center.

With the system and method of the present disclosure, various applications or services may allow users to roam between different networks, for example, VoIP services, video streaming services, or data downloading services over heterogeneous networks. As described above, p2pMM middleware may be installed on any nodes and offer the users of the nodes with seamless roaming capability for the services. DNS standard may be followed to utilize DNS servers as the mobility center. In another aspect, a mobility center may be added into the infrastructure of a service provider so that the service provider may manage their users of roaming. The mobility center could also log all roaming activities of their users, for example, for billing purposes.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for peer-to-peer mobility management in heterogeneous Internet Protocol (IP) networks, comprising:
 a mobile node including a first peer-to-peer mobility module;
 a corresponding node including a second peer-to-peer mobility module;
 wherein each of the first and the second peer-to-peer mobility modules is operable to intercept a data packet received at a communication protocol layer of an IP communication stack;
 a network interface of the mobile node that the mobile node currently uses to communicate with the corresponding node;
 a first non-transitory memory device included on said first peer-to-peer mobility module;
 a second non-transitory memory device included on said second peer-to-peer mobility module;
 a first translation table stored on the first memory device; and
 a second translation table stored on the second memory device, wherein each of the first and the second translation tables stores a real IP address of the network interface and a corresponding virtual IP address;
 wherein the first peer-to-peer mobility module is further operable to:
  modify the intercepted data packet by replacing the virtual IP address in the data packet with the corresponding real IP address stored on the first translation table;
  place the virtual IP address as an IP Header Option (IPHO) in the data packet; and
  send the data packet to the corresponding node; and
 wherein the second peer-to-peer mobility module is further operable to:
  receive the data packet sent by the first peer-to-peer mobility module; and
  based on the presence of the IPHO in the data packet, modify the received data packet by replacing the real IP address in the data packet with the corresponding virtual IP address in the IPHO of the data packet.

2. The system of claim 1, wherein the communication protocol layer includes a link layer.

3. The system of claim 1, wherein the communication protocol layer includes one or more layers above a link layer in the IP communication stack.

4. The system of claim 1, wherein the first peer-to-peer mobility module intercepts the data packet transmitted from an upper layer protocol above a link layer in the IP communication stack and modifies the intercepted data packet by replacing the virtual IP address in the data packet with the corresponding real IP address before transmitting the data packet to the link layer.

5. The system of claim 1, wherein the second peer-to-peer mobility module intercepts the data packet transmitted from a link layer of the IP communication stack and modifies the intercepted data packet by replacing the real IP address in the data packet with the corresponding virtual IP address before transmitting the data packet to an upper layer of the IP communication stack.

6. The system of claim 1, further including a mobility center, the mobility center operable to assign the virtual IP address to the corresponding real IP address of the network interface.

7. The system of claim 6, wherein the mobility center includes a memory storage device operable to store the assigned virtual IP address and the corresponding real IP address of the network interface.

8. The system of claim 6, wherein the mobility center includes a domain name server.

9. The system of claim 1, wherein the second peer-to-peer mobility module is further operable to:
 modify the intercepted data packet by replacing the virtual IP address in the data packet with the corresponding real IP address stored on the second translation table;
 place the virtual IP address as the IPHO in the data packet; and
 send the data packet to the mobile node; and
wherein the first peer-to-peer mobility module is further operable to:
 receive the data packet sent by the second peer-to-peer mobility module; and
 based on the presence of the IPHO in the data packet, modify the received data packet by replacing the real IP address in the data packet with the corresponding virtual IP address in the IPHO of the data packet.

10. A method for peer-to-peer mobility management in heterogeneous Internet Protocol (IP) networks, comprising:
 intercepting a data packet received at a communication protocol layer of an IP communication stack;
 determining a virtual IP address of a network interface, wherein the virtual IP address corresponds to a real IP address of the network interface;
 modifying the intercepted data packet by replacing the virtual IP address in the data packet with the corresponding real IP address;

placing the replaced virtual IP address as an IP Header Option (IPHO) in the data packet;

transmitting the modified data packet containing the virtual IP address as the IPHO;

receiving the transmitted data packet; and based on the presence of the IPHO in the data packet, modifying the received data packet by replacing the real IP address in the data packet with the corresponding virtual IP address in the IPHO of the data packet.

11. The method of claim 10, wherein the communication protocol layer includes a link layer.

12. The method of claim 10, wherein the communication protocol layer includes one or more layers above a link layer in the Internet Protocol communication stack.

13. The method of claim 10, further comprising:

a peer-to-peer mobility module intercepting the data packet from an upper layer protocol above a link layer of the IP communication stack; and the peer-to-peer mobility module modifying the intercepted data packet by replacing the virtual IP address in the data packet with the corresponding real IP address before transmitting the data packet to the link layer.

14. The method of claim 10, further comprising:

a peer-to-peer mobility module intercepting the data packet from a link layer of the IP communication stack; and the peer-to-peer mobility module modifying the intercepted data packet by replacing the real IP address in the data packet with the corresponding virtual IP address before transmitting the data packet to an upper layer of the communication stack.

15. The method of claim 10, wherein determining the virtual IP address includes:

requesting a mobility center to assign the virtual IP address to the corresponding real IP address of the network interface.

16. The method of claim 15, further including:

storing the virtual IP address and the corresponding real IP address.

17. The method of claim 15, wherein the mobility center is a domain name server.

18. A non-transitory, tangible program storage device readable by a system and embodying a program of instructions, wherein the program, when executed by the system, causes the system to perform the following as part of managing peer-to-peer mobility in heterogeneous Internet Protocol (IP) networks:

intercept a data packet received at a communication protocol layer of an IP communication stack;

determine a virtual IP address of a network interface, wherein the virtual IP address corresponds to a real IP address of the network interface;

modify the intercepted data packet by replacing the virtual IP address in the data packet with the corresponding real IP address;

place the replaced virtual IP address as an IP Header Option (IPHO) in the data packet;

transmit the modified data packet containing the virtual IP address as the IPHO;

receive the transmitted data packet; and based on the presence of the IPHO in the data packet, modify the received data packet by replacing the real IP address in the data packet with the corresponding virtual IP address in the IPHO of the data packet.

19. The non-transitory program storage device of claim 18, wherein the program, when executed by the system, further causes the system to perform the following:

intercept the data packet from an upper layer protocol above a link layer of the IP communication stack; and modify the intercepted data packet by replacing the virtual IP address in the data packet with the corresponding real IP address before transmitting the data packet to the link layer.

20. The non-transitory program storage device of claim 18, wherein the program, when executed by the system, further causes the system to perform the following:

intercept the data packet from a link layer of the IP communication stack; and modify the intercepted data packet by replacing the real IP address in the data packet with the corresponding virtual IP address before transmitting the data packet to an upper layer of the communication stack.

* * * * *